(12) United States Patent
Gerber et al.

(10) Patent No.: US 7,897,688 B2
(45) Date of Patent: Mar. 1, 2011

(54) AMINO GROUP-TERMINAL VISCOSIFIERS, RESULTANT PRODUCTS AND USES THEREOF

(75) Inventors: Ulrich Gerber, Uitikon-Waldegg (CH); Juergen Finter, Zurich (CH)

(73) Assignee: Sika Technology AG, Baar (CH)

( * ) Notice: Subject to any disclaimer, the term of this patent is extended or adjusted under 35 U.S.C. 154(b) by 15 days.

(21) Appl. No.: 11/990,337

(22) PCT Filed: Aug. 16, 2006

(86) PCT No.: PCT/EP2006/065342
§ 371 (c)(1),
(2), (4) Date: Dec. 18, 2008

(87) PCT Pub. No.: WO2007/020266
PCT Pub. Date: Feb. 22, 2007

(65) Prior Publication Data
US 2009/0247708 A1 Oct. 1, 2009

(30) Foreign Application Priority Data
Aug. 16, 2005 (EP) .................................. 05107523

(51) Int. Cl.
*C08L 53/00* (2006.01)
(52) U.S. Cl. .................. 525/95; 525/127; 525/128; 525/408; 525/452; 528/67; 528/68; 528/75; 528/85
(58) Field of Classification Search ............... 525/95, 525/127, 128, 452, 408; 528/67, 68, 75, 528/85
See application file for complete search history.

(56) References Cited

U.S. PATENT DOCUMENTS

| 4,251,415 A | 2/1981 | Nakada et al. |
| 4,320,047 A * | 3/1982 | Murphy et al. ............... 523/457 |
| 5,633,341 A | 5/1997 | Abend |
| 6,416,834 B1 | 7/2002 | Fuller |
| 2007/0066721 A1 * | 3/2007 | Kramer et al. ............... 523/400 |

FOREIGN PATENT DOCUMENTS

| JP | A-62-236879 | 10/1987 |
| JP | A-2001-164226 | 6/2001 |
| WO | WO 94/04624 | 3/1994 |
| WO | WO 2005-007720 | * 1/2005 |

* cited by examiner

*Primary Examiner*—David Wu
*Assistant Examiner*—Robert Jones
(74) *Attorney, Agent, or Firm*—Oliff & Berridge, PLC

(57) ABSTRACT

The invention relates to compounds embodying amino group-terminal viscosifiers, the resultant products thereof, and the uses thereof. The inventive viscosifiers are provided with formula (I), wherein $R^1$ represents a divalent radical of a carboxyl group-terminal butadiene/acrylonitrile copolymer after removing the terminal carboxyl groups. The disclosed compounds increase the viscosity of the compositions formulated therewith. Compounds containing glycidyl groups are particularly important as resultant products thereof which can be used in thermosetting single-component epoxy resin adhesives.

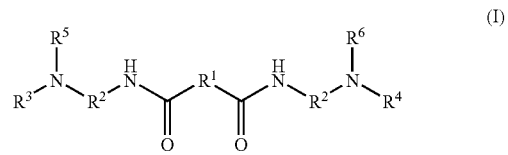

(I)

12 Claims, No Drawings

AMINO GROUP-TERMINAL VISCOSIFIERS, RESULTANT PRODUCTS AND USES THEREOF

FIELD OF THE INVENTION

The present invention relates to the field of tougheners, to derivatives thereof, and to their uses.

BACKGROUND ART

Liquid rubbers are well established and have uses which include more particularly that of increasing toughness. Through the use of chemically reactive groups, such as hydroxyl, carboxyl, vinyl or amino groups, such liquid rubbers can be incorporated chemically into the matrix. Thus, for example, there have long been reactive liquid rubbers in existence that have a butadiene/acrylonitrile polymer backbone, these rubbers being offered by B.F. Goodrich, or Noveon, under the trade name Hycar®.

Known amino-terminated liquid rubbers of this kind, such as those available commercially under the Hycar® ATBN product series, are used more particularly for epoxy resins, as a curing component, for increasing the impact toughness. These known amino-terminated liquid rubbers, however, have amino groups, which owing to the structure are readily accessible and therefore highly reactive, and occasionally have tertiary amino groups. If amino-terminated liquid rubbers of this kind are used for preparing prepolymers or compounds that contain isocyanate groups or epoxide groups, unwanted crosslinking reactions mean that storage-stable compositions are impossible.

DISCLOSURE OF THE INVENTION

It is an object of the present invention, therefore, to provide new amino-terminated tougheners, more particularly amino-terminated liquid rubbers, from which storage-stable prepolymers or compounds that contain isocyanate groups or epoxide groups can be prepared.

Surprisingly it has emerged that amino-terminated compounds of claim 1 are such tougheners which eliminate said disadvantages of the prior art.

With these amino-terminated compounds it is possible to form further derivatives which obtain an increase in toughness, more particularly in the impact toughness, of the compositions formulated with them and cured. More particularly it has emerged that it is possible, from the amino-terminated compounds and isophorone diisocyanate, to prepare polyisocyanates, and polyurethane prepolymers, respectively, which are stable on storage and which can be used for the preparation of glycidyl-terminated compounds.

It has emerged that, by means of the amino-terminated tougheners, or with the glycidyl-terminated compounds prepared from them, respectively, it is possible to produce high-impact epoxy resin adhesives, more particularly high-impact, thermosetting, one-component epoxy resin adhesives.

Embodiments of the Invention

The present invention relates to compounds which are amino-terminated tougheners, to their derivatives, and to their uses.

The tougheners of the invention are compounds of the formula (I)

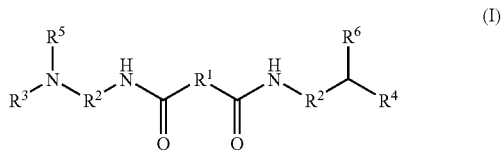

In this formula, $R^1$ is a divalent radical of a carboxyl-terminated butadiene/acrylonitrile copolymer following removal of the terminal carboxyl groups.

For the invention it is important that, additionally, the radical $R^2$ is a divalent radical of a cycloaliphatic 1,2-diamine or of an aromatic o-diamine following removal of the two primary amino groups.

Furthermore, $R^3$ and $R^4$ independently of one another are H or are a radical of the formula (II).

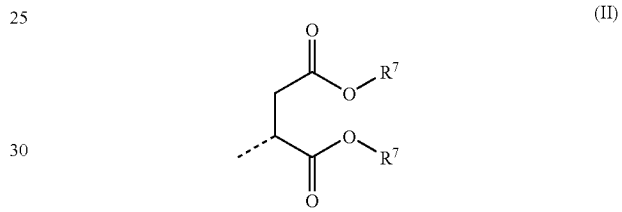

$R^7$ in this formula is an alkyl radical or allyl radical. Preferably an allyl radical ($-CH_2-CH=CH_2$) is represented by $R^7$.

Finally, $R^5$ and $R^6$ are both H or are both a radical of the formula (III).

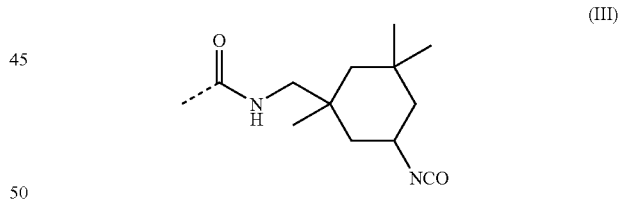

Dashed lines, here and throughout the document, symbolize the sites of connection to the other radicals.

Preferred as radical $R^2$ are, more particularly, the radicals of the formula (IV) or (V), the dashed lines representing the attachment sites to the two corresponding nitrogen atoms in formula (I).

(V)

It has been found that the structural element originating from the cycloaliphatic 1,2-diamine, or from the aromatic o-diamine, constitutes an essential element of the invention. The fact that the compounds of the invention are notable for high stability on storage is ascribed more particularly to this structural element, more particularly in combination with the structural element originating from isophorone diisocyanate, or from maleic diester, respectively. Specifically, then, the amide protons, and the urea protons that may be present if need be, are protected against attack by reactive compounds, which can be a cause of crosslinking reaction. Furthermore, it is important for the utilization of these compounds, or their derivatives, for the formation of storage-stable epoxy resin compositions, that no tertiary amine groups at all are formed or introduced, since these tertiary amine groups are known to trigger the homopolymerization of epoxy resins, or to catalyze it, and would therefore lead to premature crosslinking of these epoxy resins.

$R^1$ is more particularly a radical of the kind obtained by formal removal of the carboxyl groups of a carboxyl-terminated butadiene/acrylonitrile copolymer sold commercially under the name Hycar® CTBN from Noveon.

The radical $R^1$ preferably has the formula (VI)

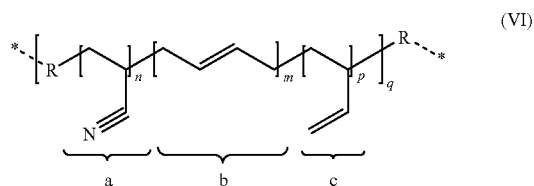
(VI)

The dashed lines represent the attachment sites of the two carboxyl groups of the carboxyl-terminated butadiene/acrylonitrile copolymer.

The substituent R in this formula is a linear or branched alkylene radical having 1 to 6 C atoms, more particularly having 4 C atoms, which is optionally substituted by unsaturated groups. In one embodiment deserving particular mention the substituent R is a substituent of the formula (X), where here again the dashed lines represent the attachment sites (X)

Furthermore, the index q is a value between 40 and 70, more particularly between 50 and 70. Furthermore, the designations a and b are the structural elements originating from butadiene, and a is the structural element originating from acrylonitrile. The indices n, m, and p in turn are values which describe the relationship between the structural elements a, b and c. The index n stands for values of 0.05-0.3, the index m for values of 0.5-0.8, and the index p for values of 0.1-0.2, with the proviso that the sum of n, m, and p is equal to 1.

To a skilled worker it is clear that the structures shown in formula (IV), like those, moreover, shown in formulae (VII), (VIII), (IX), and (X) are to be understood as simplified representations. Accordingly the units a, b, and c may in each case be disposed randomly, in alternation or blockwise with respect to one another. More particularly, formula (VI) does not necessarily represent a triblock copolymer.

In one preferred embodiment the substituents $R^3$, $R^4$, $R^5$, and $R^6$ are each a hydrogen. This embodiment of the formula (I) is an amino-terminated liquid rubber. From this embodiment it is possible to prepare all embodiments of the compound of the formula (I) and also their derivatives of the present invention. As a particularly preferred embodiment of the formula (I) an amino-terminated compound of this kind has the structure of the formula (VII).

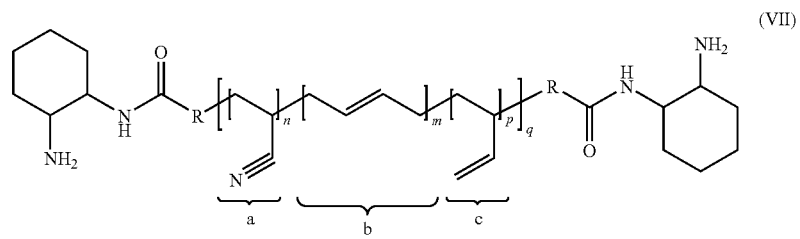
(VII)

The other substituents and indices have the definitions already mentioned previously.

In a further preferred embodiment the substituents $R^3$, $R^5$, and $R^6$ are each a hydrogen and $R^4$ is a substituent of the formula (II). As a further particularly preferred embodiment the compound of the formula (I) has the structure of the formula (VIII).

More particularly it is possible to prepare them from a carboxyl-terminated butadiene/acrylonitrile copolymer of the type commercialized in the form of Hycar® CTBN.

With particular preference these compounds can be prepared from carboxyl-terminated butadiene/acrylonitrile copolymers of the type commercialized in the form of Hycar® CTBN and from 1,2-diaminocyclohexane.

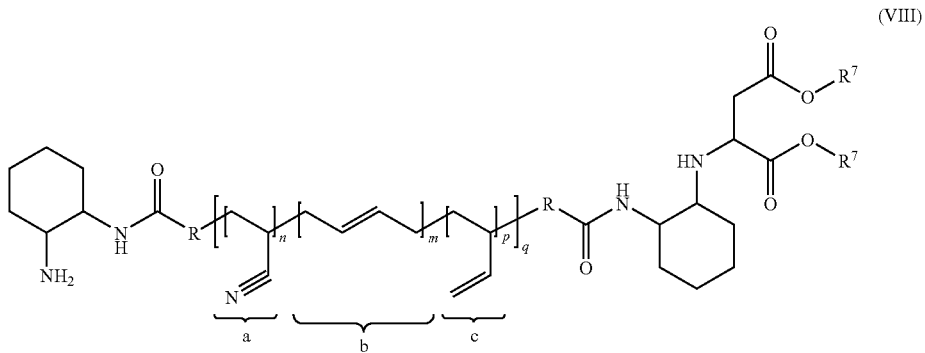

(VIII)

The other substituents and indices have the definitions already mentioned previously.

In a further preferred embodiment the substituent $R^3$ is a hydrogen, $R^4$ is a substituent of the formula (II), and $R^5$ and $R^6$ are each a substituent of the formula (III). As a further particularly preferred embodiment the compound of the formula (I) has the structure of the formula (IX).

More particularly it is possible in a simple way to prepare compounds of the formula (I) from the reaction of compounds of the formula (I) in which a hydrogen represents each of the substituents $R^3$, $R^4$, $R^5$, and $R^6$, more particularly from those compounds of the formula (VII), with maleic acid dialkyl ester or maleic acid diallyl ester and/or isophorone diisocyanate (IPDI).

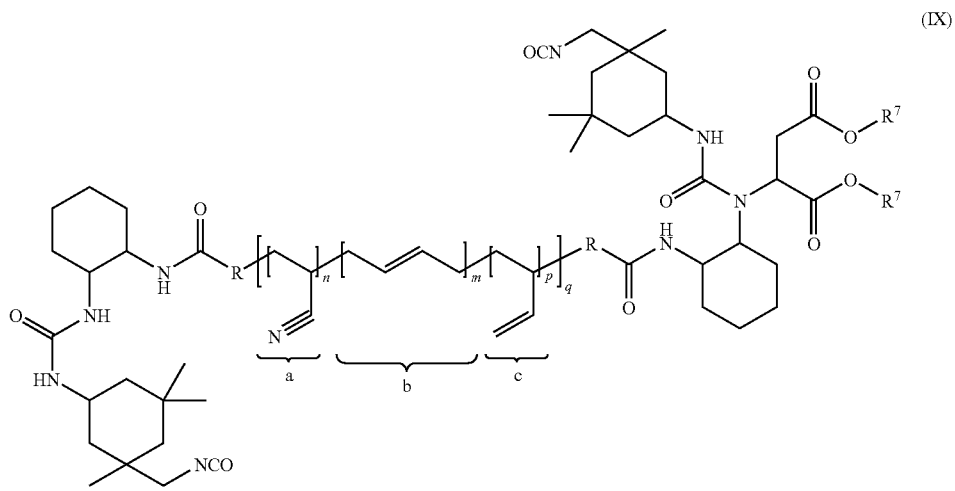

(IX)

The other substituents and indices have the definitions already mentioned previously.

The compounds of the formula (I) can be prepared from carboxyl-terminated butadiene/acrylonitrile copolymers and also of the formula HOOC—$R^1$—COOH and cycloaliphatic 1,2-diamine or of an aromatic o-diamine. This preparation takes place in a way which is known fundamentally for amide preparation. In order to prevent or greatly reduce crosslinking reactions this amidation takes place in a high stoichiometric excess of the diamine and, where appropriate, in a suitable solvent. The excess diamine can be separated off by distillation if necessary.

Thus compounds of the formula (VIII) can be prepared from compounds of the formula (VII) and maleic acid dialkyl ester or maleic acid diallyl ester. In this case addition takes place via a Michael reaction of the primary amino group of the compound of the formula (VII) to the double bond of the maleic acid dialkyl ester or maleic acid diallyl ester. The skilled worker knows the conditions for this reaction and also the fact that by varying the stoichiometric proportion it is possible to optimize the yield in order to form the compound of the formula (VIII).

Also possible in principle are compounds of the formula (I) in which the substituents $R^5$ and $R^6$ are each a substituent of the formula (III) and $R^3$ and $R^4$ are each hydrogen:

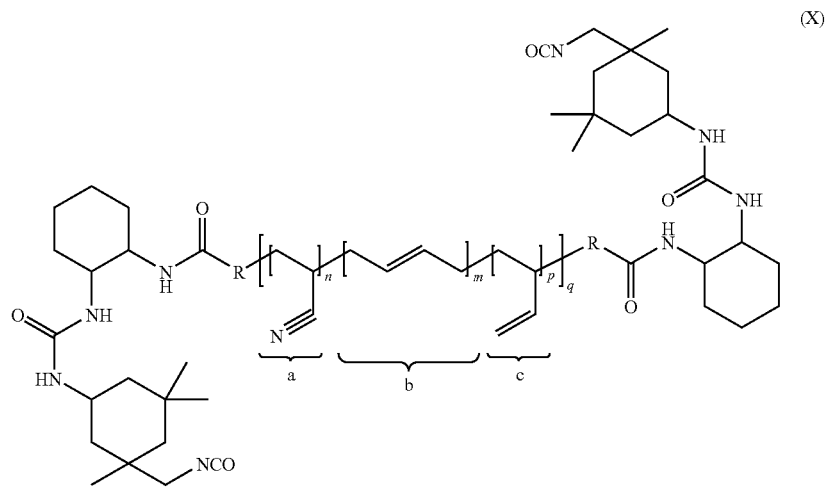

(X)

Compounds of the formula (X) of this kind, however, are less preferred. They can be prepared from compounds of the formula (VII) with isophorone diisocyanate (IPDI).

Also possible, furthermore, are compounds of the formula (I) in which the substituents $R^3$ and $R^4$ are each a substituent of the formula (II), and $R^5$ and $R^6$ are each hydrogen or are each a substituent of the formula (III):

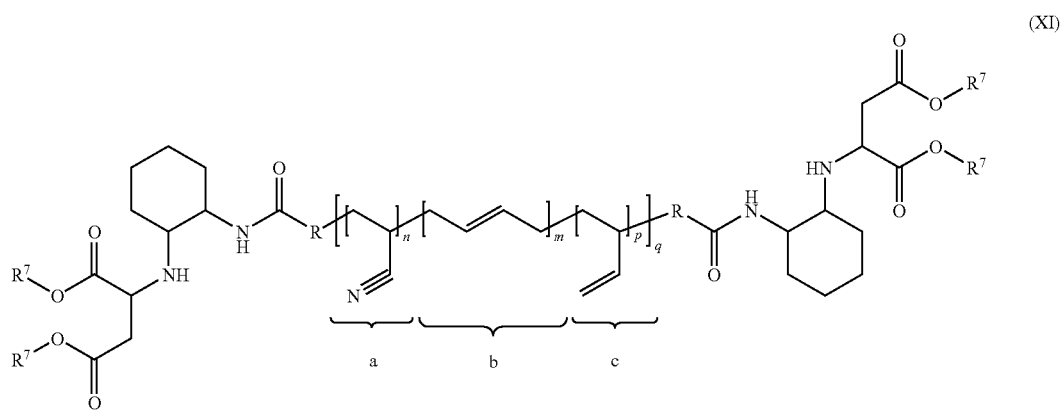

(XI)

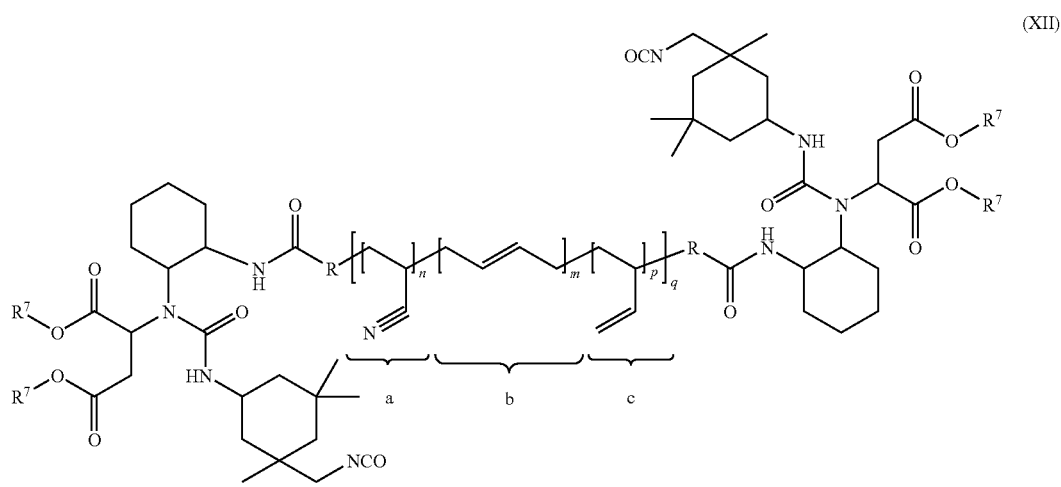

(XII)

Compounds of the formula (XI) or (XII) of this kind, however, are less preferred. They can be prepared by Michael addition of maleic acid dialkyl ester or maleic acid diallyl ester to compounds of the formula (VII) directly, or by means of a subsequent reaction with isophorone diisocyanate (IPDI). Here again, the stoichiometric proportions of the reactants are important for the yield of the respective above compounds.

The invention further provides a process for preparing polyisocyanate compounds.

This process comprises the steps of
i) reacting x mol of a carboxyl-terminated butadiene/acrylonitrile copolymer with y mol of a cycloaliphatic 1,2-diamine or of an aromatic o-diamine having two primary amino groups in the proportion $y/x \geq 2$ under conditions which lead to the formation of amide groups;
ii) reacting the product with z mol of isophorone diisocyanate in the ratio $z/x+ \geq 2$ with formation of urea groups.

Preferably reaction step i) is followed and reaction step ii) is preceded by an additional step i'):
i') a reaction of xx mol of maleic acid dialkyl ester or maleic acid diallyl ester in the proportion $xx/x \geq 0.6$, more particularly $\geq 1$, under conditions which allow Michael addition of the primary amino groups to the double bond of the maleic ester.

The conditions which in step i) lead to the formation of amide groups, or which in step ii) lead to the formation of urea groups, or which in step i') lead to the Michael addition are very well known to the skilled worker.

In this case, carboxyl-terminated butadiene/acrylonitrile copolymers are more particularly carboxyl-terminated butadiene/acrylonitrile copolymers of the formula (XIII)

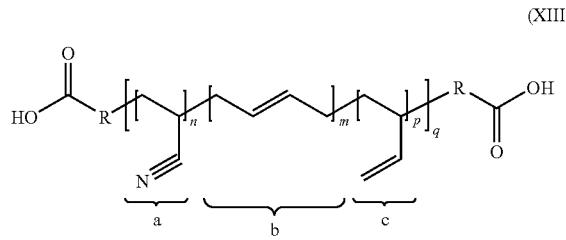

(XIII)

where the substituents and indices have the preferred embodiments and definitions already described above.

Particular preference is given to using carboxyl-terminated butadiene/acrylonitrile copolymers of the kind sold commercially under the trade name Hycar® CTBN by Noveon.

Preference is given more particularly to cycloaliphatic 1,2-diamines. The most preferred cycloaliphatic 1,2-diamine is 1,2-diaminocyclohexane.

The invention further provides a process for preparing a mixture of polyisocyanate compounds. This process comprises the steps of:
I) reacting x mol of a carboxyl-terminated butadiene/acrylonitrile copolymer with y mol of a cycloaliphatic 1,2-diamine or of an aromatic o-diamine having two primary amino groups in the proportion $y/x \geq 2$ under conditions which lead to the formation of amide groups;
II) adding xy mol of a diol, more particularly of a polyether diol;
III) reacting the product with z mol of isophorone diisocyanate in the ratio $z/(x+xy) \geq 2$ with formation of urea groups.

Preferably reaction step I) is followed and reaction step II) is preceded by an additional step I'):
I') reaction of xx mol of maleic acid dialkyl ester or maleic acid diallyl ester in the proportion $xx/x \geq 0.6$, more particularly $\geq 1$, under conditions which allow Michael addition of the primary amino groups to the double bond of the maleic ester.

The conditions which in step I) lead to the formation of amide groups, or which in step III) lead to the formation of urea groups, or which in step I') lead to the Michael addition are very well known to the skilled worker.

In this case, carboxyl-terminated butadiene/acrylonitrile copolymers are more particularly carboxyl-terminated butadiene/acrylonitrile copolymers of the formula (XIII)

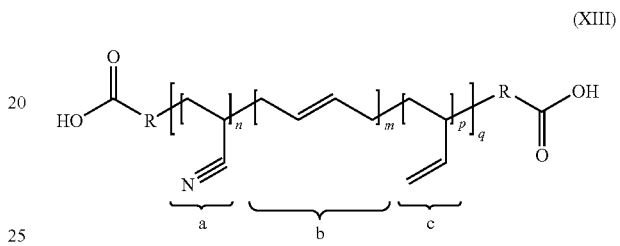

(XIII)

where the substituents and indices have the preferred embodiments and definitions already described above.

Particular preference is given to using carboxyl-terminated butadiene/acrylonitrile copolymers of the kind sold commercially under the trade name Hycar® CTBN by Noveon.

Preference is given more particularly to cycloaliphatic 1,2-diamines. The most preferred cycloaliphatic 1,2-diamine is 1,2-diaminocyclohexane.

More particular suitability as polyether diol is possessed by polyoxyalkylene diols. A particularly preferred polyether diol is poly(oxy-1,4-butanediyl)-α-hydro-ω-hydroxyl, which is also known to the skilled worker as poly THF or polytetramethylene ether glycol. Poly THFs of this kind are available commercially as product series under the name Terathane® from DuPont or Poly-THF from BASF Corp.

It has been found particularly suitable for the molar-mass ratio of carboxyl-terminated butadiene/acrylonitrile copolymer to diol to have a value of $1.5 \geq xy/x \geq 0.75$.

Owing to the already high viscosity of the carboxyl-terminated butadiene/acrylonitrile copolymers which are used as a starting product for the compounds of the formula (I), the viscosity of the compounds and/or their derivatives is likewise high. It is therefore advantageous for the compounds of the formula (I), and/or their derivatives, to have a viscosity such as to allow processing with means typically used for high-viscosity and pastelike substances. For their function as tougheners, it is of particular advantage if they have a viscosity of the kind typically encountered in liquid rubbers.

More particularly it is of advantage if the viscosity of the compounds (I) is not more than three times that of the carboxyl-terminated butadiene/acrylonitrile copolymers used. Preferably the viscosity of the compounds (I) at 25° C. is less than 600 Pa·s, more particularly less than 400 Pa·s.

The usefulness of the compounds of the formula (I) is broad. For instance, amino-terminated tougheners, more particularly those of the formula (VII), are starting products for derivatives. Thus, for example, such compounds can be reacted with compounds having functional groups which are reactive with amino groups. Derivatives of this kind, more particularly adducts, may in turn react further. Thus, for example, epoxide-terminated tougheners can be prepared from the amino-terminated tougheners by means of diepoxides or polyepoxides. Of particular interest as derivatives of amino-terminated tougheners are tougheners containing isocyanate groups, more particularly those tougheners of the formula (I) with substituents of the formula (III) for $R^5$ and $R^6$ which can be prepared from amino-terminated tougheners and polyisocyanates. These isocyanate-terminated tougheners are compounds of great interest insofar as it is possible, starting from them, to prepare, by means of further reactions, a large number of reactive tougheners having any of a very wide variety of chemical functionalities, and prepolymers. Accordingly it is possible, for example, to realize prepolymers or tougheners terminated with (meth)acrylate, vinyl, allyl, epoxide, hydroxy, mercapto or alkoxysilane groups. These prepolymers can be cured themselves or as part of a resin, or may function as curing agents.

The compounds of the formula (I), more particularly the amino-functional tougheners and/or their derivatives, are also especially suitable as curing agents. Thus compounds of the formula (I) in which at least the radicals $R^5$ and $R^6$, more particularly the radicals $R^3$, $R^4$, $R^5$, and $R^6$, are H are curing agents or curing ingredients for compounds having two or more amine-reactive functional groups. More particularly they are suitable as curing agents or curing ingredients for epoxy resins or epoxy resin compositions or for polyisocyanates or for polyurethane prepolymers containing isocyanate groups.

In the cases where the compounds of the formula (I) or their derivatives contain isocyanate groups, these compounds can cure with moisture and are therefore suitable alone or as an ingredient in a composition in the form of moisture-curing systems, more particularly as adhesives or sealants. Compositions of this kind preferably comprise at least one compound of the formula (I) in which the substituents $R^5$ and $R^6$ are both a radical of the formula (III) and also at least one NCO-containing polyurethane prepolymer prepared from the reaction of at least one polyol and at least one polyisocyanate.

One specific embodiment of the invention is represented by glycidyl-containing compounds of the formula (XIV)

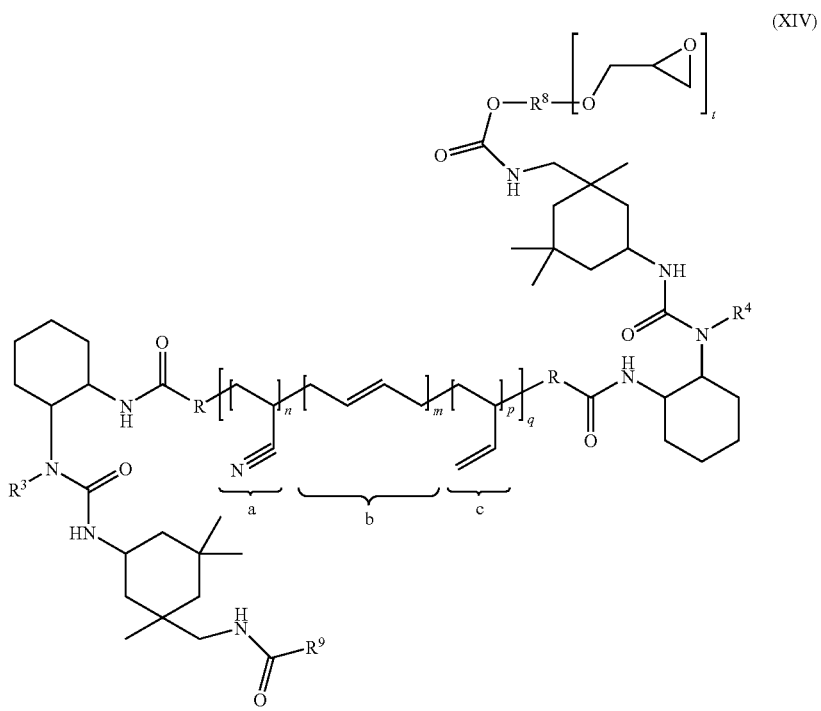

(XIV)

where the designations, indices, and substituents have the definitions and preferred embodiments already mentioned.

Furthermore, $R^8$ is a (t+1)-valent organic radical, t in turn being a value of 1, 2, 3 or 4. $R^9$ is the formula (XV) or formula (XVI) or is a radical of a primary monoamine following removal of one H of the amino group, more particularly the radical of the formula (XVII).

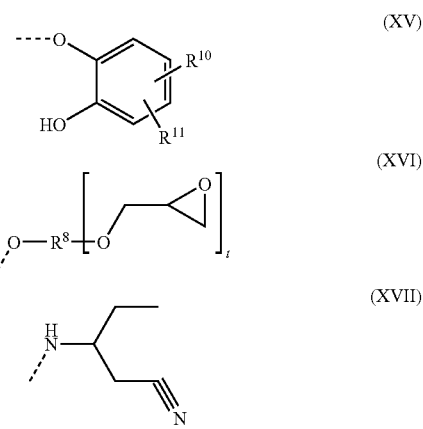

$R^{10}$ in this formula is H or an alkyl radical, more particularly methyl or tert-butyl. $R^{11}$ in this formula is H or an alkyl radical.

With particular preference R⁸ is a trivalent organic substituent, i.e., t=3. One particularly preferred radical R⁸ is the trivalent radical of the formula (XVIII).

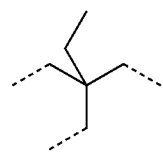
(XVIII)

With particular preference R⁸ is a trivalent organic substituent, i.e., t=3. One particularly preferred radical R⁸ is the trivalent radical of the formula (XVIII).

The glycidyl-containing compound of the formula (XIV) is preferably a glycidyl-containing compound of the formula (XIX)

-continued

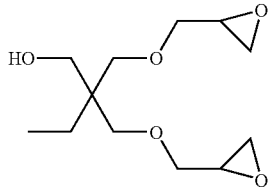
(XXI)

and also, if appropriate, a catechol, an alkylcatechol or a dialkylcatechol, more particularly tert-butylcatechol, or a primary monoamine. More particular alkylcatechol suitability is possessed by 4-methylcatechol and tert-butylcatechol, and more particular dialkylcatechol suitability by 3,4-dimethylcatechol and 3,6-dimethylcatechol. 4-tert-Butylcatechol is particularly preferred on account of its low melting point and

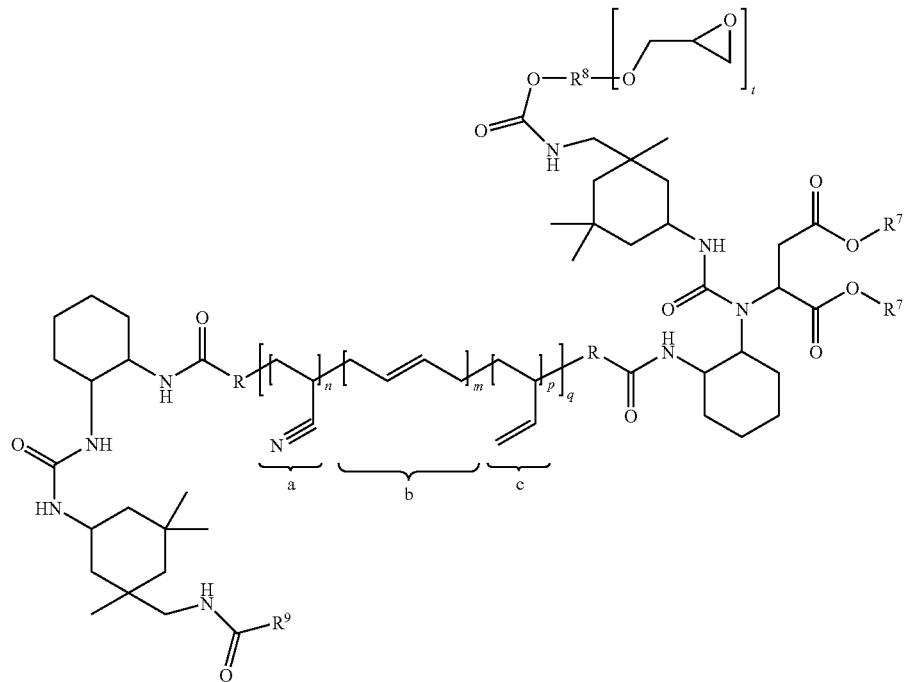
(XIX)

where the designations, indices, and substituents have the definitions and preferred embodiments already mentioned.

Glycidyl-containing compounds of this kind of the formula (XIV), or of the formula (XIX), are obtainable from the reaction of a compound of the formula (IX), or of the formula (X), or of the formula (XII), respectively, with at least one monohydroxyl-glycidyl compound of the formula (XX), more particularly of the formula (XXI)

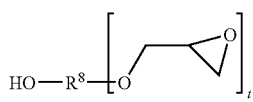
(XX)

advantageous toxicity. The use of catechol, alkylcatechol or dialkylcatechol has proven particularly advantageous for epoxy resin compositions, since the phenolic group which remains produces accelerating curing.

Monohydroxyl-glycidyl compounds of this kind can be produced, for example, by reacting polyols with epichlorohydrin. Depending on the reaction regime, the reaction of polyfunctional alcohols with epichlorohydrin produces by-products which include the corresponding monohydroxyl-glycidyl compounds in different concentrations. These compounds can be isolated by means of typical separating operations. In general, however, it is sufficient to use the product mixture which is obtained in the glycidylization reaction of polyols and which is composed of polyol having undergone full reaction and partial reaction to the glycidyl ether. Examples of such hydroxyl-containing epoxides are trimethylolpropane diglycidyl ether (present as a mixture in trimethylolpropane triglycidyl ether), glycerol diglycidyl ether (present as a mixture in glycerol triglycidyl ether), pentaerythritol triglycidyl ether (present as a mixture in pentaerythritol tetraglycidyl ether). Preference is given to using trimethylolpropane diglycidyl ether, which occurs in a relatively high proportion in typically prepared trimethylolpropane triglycidyl ether.

It is, however, also possible to use other, similar hydroxyl-containing glycidyl compounds, more particularly glycidol, 3-glycidyloxybenzyl alcohol. Further preference is given to the β-hydroxy ether of the formula below, which is present at about 15% in commercially customary liquid epoxy resins prepared from bisphenol A (R'=CH$_3$) and epichlorohydrin, and also the corresponding β-hydroxy ethers of the formula below which are formed in the reaction of bisphenol F (R'=H) or of the mixture of bisphenol A and bisphenol F with epichlorohydrin.

In this case it is preferred for the compounds of the formula (IX), (X) or (XII) to be reacted first, if need be, with catechol, alkylcatechol or dialkylcatechol or with the primary monoamine to form an adduct. In this case it is preferred if a stoichiometry of approximately 1 mol of the formula (IX), (X) or (XII) to 0.2 to 0.5 mol, more particularly 0.2 to 0.3 mol, of the catechol, alkylcatechol or dialkylcatechol is used, leading to mixtures of adducts and compounds of the formula (IX), (X) or (XII). Subsequently a reaction with at least one monohydroxyl-glycidyl compound of the formula (XX) is carried out, in an amount such that all of the isocyanate groups have undergone reaction.

In one preferred embodiment the compound of the formula (IX) is in this case reacted with catechol, an alkylcatechol or dialkylcatechol, more particularly with tert-butylcatechol, more particularly in a molar-mass ratio of formula (IX) to catechol, alkylcatechol or dialkylcatechol, more particularly

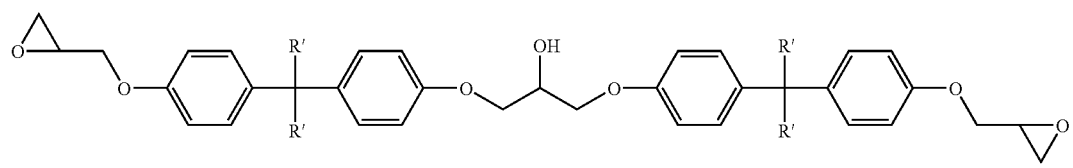

(XXII)

Species of this kind are also present at low concentrations in commercial solid resins.

Moreover it is also possible to use any of a very wide variety of epoxides having a β-hydroxy ether group, prepared by the reaction of (poly)epoxides with a substoichiometric amount of monovalent nucleophiles such as carboxylic acids, phenols, thiols or secondary amines.

The free primary or secondary OH functionality of the monohydroxyl-epoxide compound of the formula (XX) permits efficient reaction with compounds containing isocyanate groups, without it being necessary, for this purpose, to use disproportionately large excesses of the epoxide component of the formula (XX).

As a primary monoamine, the monoamine of the formula (XXIII) has proven more particularly to be especially favorable.

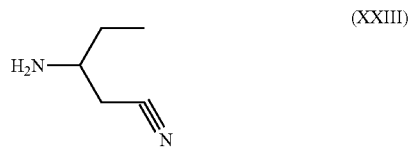

(XXIII)

to tert-butylcatechol, of approximately 1:0.2 to 0.5, followed by a reaction with the monohydroxyl-glycidyl compound.

It has proven particularly advantageous to use different monohydroxyl-glycidyl compounds of the formula (XX). A reaction sequence which was found particularly successful was that of a) a monohydroxyl-glycidyl compound of the formula (XXI), followed by a reaction b) with a liquid epoxy resin, and, if need be, by a reaction c) with a solid epoxy resin.

Liquid epoxy resins are known to the skilled worker. Preferred liquid epoxy resins are diglycidyl ethers of bisphenol A (DGEBA), of bisphenol F, and of bisphenol A/F (the designation 'A/F' here refers to a mixture of bisphenol A and bisphenol F which is used as a reactant in its preparation). Liquid resins of this kind are available, for example, as Araldite® GY 250, Araldite® PY 304, Araldite® GY 282 (Huntsman) or D.E.R. 331 (Dow) or Epikote 828 (Resolution).

Solid epoxy resins are known to the skilled worker. Preferred solid epoxy resins are higher diglycidyl ethers of bisphenol A (DGEBA), of bisphenol F, and of bisphenol A/F (the designation 'A/F' here refers to a mixture of acetone with formaldehyde which is used as a reactant in its preparation). Preferred solid epoxy resins have the formula (XXIV)

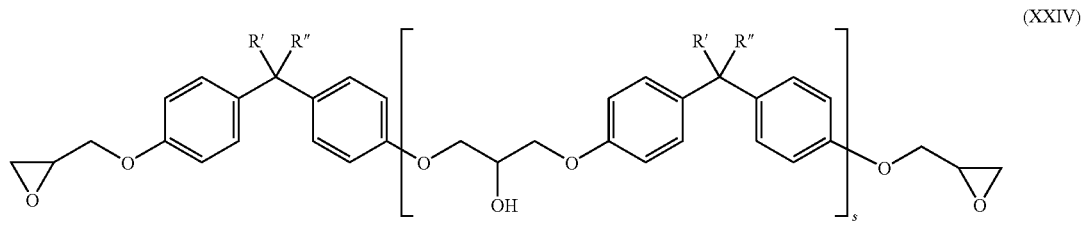

(XXIV)

In this formula the substituents R' and R" independently of one another are either H or $CH_3$. Furthermore, the index s is a value of >1.5, more particularly of 2 to 12. Solid epoxy resins of this kind are available commercially, for example, from Dow or Huntsman or Resolution.

The use of solid epoxy resins has emerged as being particularly advantageous since it gives rise to advantages in terms of the glass transition temperature Tg and also in the mechanical strengths, more particularly the tensile strength.

Glycidyl-containing compounds of this kind are more particularly well suited to use as an epoxy resin adhesive or as an additive in epoxy resin adhesives. In one particularly preferred embodiment they find use as epoxy resin adhesives or in thermosetting epoxy resin adhesives. Thermosetting adhesives of this kind are one-component.

The amount of glycidyl-containing compounds of the formula (XIV), more particularly of the formula (XIX), is preferably between 2% and 50% by weight, based on the epoxy resin adhesive composition.

Thermosetting epoxy resin adhesives of this kind more particularly comprise, in addition to at least one glycidyl-containing compound of the formula (XIV), more particularly of the formula (XIX), at least one liquid epoxy resin and also at least one curing agent which can be activated by elevated temperature. Furthermore, solid epoxy resins and also fillers are ingredients which can be used with advantage.

A curing agent which can be activated by elevated temperature in this case is preferably a curing agent which is selected from the group consisting of dicyandiamide, guanamines, guanidines, aminoguanidines, and their derivatives. Additionally possible are catalytically active substituted ureas such as 3-chloro-4-methylphenylurea (chlortoluron), or phenyl-dimethylureas, more particularly p-chlorophenyl-N,N-dimethylurea (monuron), 3-phenyl-1,1-dimethylurea (fenuron) or 3,4-dichlorophenyl-N,N-dimethylurea (diuron). Additionally it is possible to use compounds from the class of the imidazoles and amine complexes. Particular preference is given to dicyandiamide.

Advantageously the total fraction of the curing agent is 1%-10% by weight, preferably 2%-8% by weight, based on the weight of the overall adhesive composition.

In one preferred embodiment the adhesive composition comprises at least one filler. This is preferably mica, talc, kaolin, wollastonite, feldspar, chlorite, bentonite, montmorillonite, calcium carbonate (precipitated or ground), dolomite, quartz, silicas (fumed or precipitated), cristobalite, calcium oxide, aluminum hydroxide, magnesium oxide, hollow ceramic beads, hollow glass beads, hollow organic beads, glass beads or color pigments. By fillers are meant not only the organically coated forms but also the uncoated commercially available forms and forms known to the skilled worker. Considered particularly preferred fillers are wollastonite and fumed silica, of the kind offered commercially, for example, under the trade name Aerosil® by Degussa. Advantageously the total fraction of the total filler is 3%-30% by weight, preferably 5%-25% by weight, based on the weight of the overall adhesive composition.

Where appropriate it is also possible to use reactive diluents which carry epoxide groups, as further ingredients of the adhesive, more particularly in an amount of 1%-7% by weight, preferably 2%-6% by weight, based on the weight of the overall adhesive composition.

The composition may additionally comprise further ingredients, more particularly catalysts, heat stabilizers and/or light stabilizers, thixotropic agents, plasticizers, solvents, dyes, and pigments.

An adhesive of this kind is first contacted with the materials to be bonded at a temperature of between 10° C. and 80° C., more particularly between 10° C. and 60° C., and subsequently cured at a temperature of typically 100-220° C., preferably 120-200° C.

Such adhesives are required for the bonding of heat-stable materials. By heat-stable materials are meant materials which are dimensionally stable, at least during the cure time, at a curing temperature of 100-220° C., preferably 120-200° C. More particularly they are metals and plastics such as ABS, polyamide, polyphenylene ethers, composite materials such as SMC, unsaturated polyester GRP, composite epoxy materials or composite acrylate materials. Preference is given to the application where at least one material is a metal. Considered a particularly preferred utility is the adhesive bonding of like or different metals, more particularly in body shell construction in the automobile industry. The preferred metals are especially steel, more particularly electrolytically galvanized, hot-dip-galvanized, oiled steel, Bonazinc-coated steel, and subsequently phosphated steel, and also aluminum, more particularly in the versions typically encountered in automaking.

The compounds of the formula (I), and/or their derivatives, additionally feature high oil absorbency.

All compounds, compositions, and adhesives of the invention are storage-stable: that is, they do not crosslink during the storage time, which is typically at least one month, preferably at least three months, if stored in the absence of moisture at temperatures of below 50° C.

In principle all compounds of the formula (I) and their derivatives find use as ingredients of compositions, more particularly as reactive impact modifiers. These compounds and derivatives have a rubber like nature. It is particularly advantageous if they are incorporated into the adhesive matrix as the adhesive cures. The compounds in question here are more particularly the compounds of the formula (I), the polyisocyanate compounds prepared by the process described, and the glycidyl compounds of the formula (XIV).

The use of the compounds of the formula (I), and/or of their derivatives, produces an improvement in the toughness, including more particularly the toughness at low temperatures: that is, more particularly, at temperatures below 0° C. Thus it has been observed that it is possible to realize impact toughness in adhesives not only at relatively high temperatures but also, especially, at low temperatures, more particularly between 0° C. to −40° C. It has been possible to use the compounds of the invention, and/or their derivatives, to prepare thermosetting epoxy resin adhesives which, after curing by means of heat, have fracture energies, measured in accordance with DIN 11343, of more than 10.0 J at 23° C. and more than 5.0 J at −40° C. From time to time it is possible to formulate compositions which have fracture energies of more than 12 J at 23° C. and of more than 7.0 J at −40° C. Particularly advantageous compositions even had fracture energies of more than 14.0 J at 23° C. and of more than 8 J at −40° C.

In particular they are used in reactive compositions which can be cured.

Examples

Exemplary Preparation of a Monohydroxyl-Containing Epoxide "MHE"

Trimethylolpropane glycidyl ether was prepared in accordance with the method in U.S. Pat. No. 5,668,227, example 1, from trimethylolpropane and epichlorohydrin, using tetramethylammonium chloride and aqueous sodium hydroxide solution. This gives a yellowish product with an epoxide number of 7.5 eq/kg and a hydroxyl group content of 1.8 eq/kg. From the HPLC-MS spectrum it can be concluded that what is present is essentially a mixture of trimethylolpropane diglycidyl ether and trimethylolpropane triglycidyl ether.

Preparation of Inventive Compounds and Compositions

The compounds and compositions specified in table 1 were prepared.

The carboxyl-terminated butadiene/acrylonitrile copolymer was introduced as an initial charge, together with 1,2-diaminocyclohexane or 1,3-diaminopentane and with butyl titanate as catalyst, and this initial charge was heated to a temperature of approximately 180° C. After the removal of the water by distillation the batch was cooled.

Where appropriate, maleic acid diallyl ester was subsequently added.

The compounds containing isocyanate groups in examples B3 to B11 were subsequently admixed with the monoamine or tert-butylcatechol and reacted at a temperature of around 80°. Subsequently these further products were admixed with the monohydroxyl-glycidyl compound and then with the liquid resin, and finally, where appropriate, with the solid resin, and the mixture was stirred at 90° C. until the solid resin had fully dissolved.

All of examples B1 to B11 are storage-stable.

TABLE 1

Preparation of compositions.

| | B1 | B2 | Ref. 1 |
|---|---|---|---|
| Hycar ® CTBN 1300X8 | 90.85% | 88.05% | 90.85% |
| 1,2-Diaminocyclohexane | 9.09% | 8.81% | |
| 1,3-Pentanediamine (Dytek ® EP) | | | 9.09% |
| Tetrabutyl orthotitanate | 0.06% | 0.06% | 0.06% |
| Maleic acid diallyl ester | | 3.08% | |
| Amine number [mg KOH/g] | 53.8 | 47.2 | n.m.* |
| Viscosity (20° C.) [Pa · s] | 320 | 360 | n.m.* |

*n.m. = not measured.

TABLE 2

Preparation of compositions.

| | B3 | B4 | B5 | B6 | B7 | B8 | B9 | B10 | B11 | Ref. 2 | Ref. 3 | Ref. 4 |
|---|---|---|---|---|---|---|---|---|---|---|---|---|
| Ref. 1 [g] | | | | | | | | | | 100 | | |
| B1 [g] | | | | | | | 100 | 120 | 100 | | | |
| B2 [g] | 80 | 80 | 80 | 60 | 60 | 60 | | | | | | |
| Hycar ® ATBN 1300 × 42 [g] | | | | | | | | | | | 60 | |
| Hycar ® ATBN 1300 × 16 [g] | | | | | | | | | | | | 66.80 |
| Poly-THF ® 1800 [g] | 80 | 80 | 80 | 90 | 90 | 90 | 100 | 80 | 100 | 100 | 90 | 100 |
| IPDI [g] | 35.07 | 35.07 | 35.40 | 34.56 | 34.56 | 34.56 | 42.59 | 40.43 | 42.59 | 42.59 | 34.56 | 42.59 |
| Dibutyltin dilaurate [g] | 0.06 | 0.06 | 0.06 | 0.06 | 0.06 | 0.05 | 0.04 | 0.04 | 0.04 | 0.04 | 0.06 | 0.06 |
| NCO content [%] | 3.53 | 3.53 | 3.40 | 3.65 | 3.65 | 3.67 | 3.49 | 3.30 | 3.49 | n.d.* | n.d.* | n.d.* |
| 3-Aminopentanenitrile [g] | 3.21 | 3.28 | | | | | | | 3.95 | | | |
| tert-Butylcatechol [g] | | | 5.24 | 5.32 | 7.54 | 6.00 | | | | | | |
| 4-Methylcatechol [g] | | | | | | | | | | | | |
| MHE [g] | 63.7 | 65 | 61.5 | 62.3 | 50.5 | 53.7 | 123.13 | 115.39 | 95.15 | | | |
| Araldite GY-250 [g] | 148 | 133 | 149 | 140 | 140 | 140 | 80.86 | 80.14 | 80.86 | | | |
| Araldite GT 7071 [g] | 168 | 183 | 168 | 159 | 159 | 159 | | | | | | |
| Epoxy content [eq/kg] | 2.75 | 2.67 | 2.72 | 2.75 | 2.65 | 2.68 | 2.92 | 2.85 | 2.64 | | | |

*n.d. = not determined, owing to gelling.

Starting from B2, or B1, or Ref. 1 or from the commercial amino-terminated butadiene/acrylonitrile copolymer Hycar® ATBN, the examples B3 to B8, or the examples B9 to B11, or the comparative examples Ref. 2, Ref. 3 and Ref. 4, were reacted further in accordance with table 2. B2 was mixed with the polyol and admixed with IPDI and reacted with heating to give an intermediate containing isocyanate group. The isocyanate content specified in table 2 was ascertained. In the case of reference examples Ref. 2 to Ref. 4, however, gelling was observed at this point, and so those experiments had to be terminated.

Preparation of Adhesives

The compositions B3 to B11 were used to prepare thermosetting epoxy resin adhesives. For this purpose the ingredients as per table 3 were mixed in a Schramoid mixer. The amount of the curing agent, dicyandiamide, was used in relation to the same epoxy content.

All of adhesives K1 to K11 are storage-stable.

Test Methods:

Tensile Strength (TS)/Breaking Extension (DIN EN ISO 527)

The tensile strength and breaking extension of the specimens were determined in accordance with DIN EN ISO 527, with a pulling speed of 2 mm/min.

Viscosity

The viscosities were measured on a cone/plate rheomat (Bohlin CV120HR) at 20° C. using a 20 mm spindle (spindle 4) and a shear rate of 50 sol.

Tensile Shear Strength (TSS) (DIN EN 1465)

The specimens were produced from the example compositions described and using electrolytically galvanized steel (eloZn) with the dimensions 100×25×0.8 mm; the bond area was 25×10 mm with a layer thickness of 0.3 mm. Curing was carried out at 180° C. for 30 minutes. The pulling speed was 10 mm/min.

24 hours under standard conditions (23° C./50% relative humidity)

Impact Peel Energy (ISO 11343)

The specimens were produced from the example compositions described and using electrolytically galvanized steel (eloZn) with the dimensions 90×20×0.8 mm; the bond area was 20×30 mm with a layer thickness of 0.3 mm. Curing was carried out at 180° C. for 30 minutes. The pulling speed was 2 m/s. The figure reported as the fracture energy in joules is the area beneath the curve (from 25% to 90%, in accordance with DIN 11343).

TABLE 3

Adhesive compositions and properties.

| | K1 | K2 | K3 | K4 | K5 | K6 | K9 | K10 | K11 |
|---|---|---|---|---|---|---|---|---|---|
| B3 [g] | 350 | | | | | | | | |
| B4 [g] | | 350 | | | | | | | |
| B5 [g] | | | 350 | | | | | | |
| B6 [g] | | | | 350 | | | | | |
| B7 [g] | | | | | 350 | | | | |
| B8 [g] | | | | | | 350 | | | |
| B9 [g] | | | | | | | 150 | | |
| B10 [g] | | | | | | | | 150 | |
| B11 [g] | | | | | | | | | 150 |
| Araldite GY-250 [g] | | | | | | | 50 | 50 | 50 |
| Araldite GT 7071 [g] | | | | | | | 100 | 100 | 100 |
| Dicyandiamide [g] | 13.5 | 13.0 | 13.3 | 13.5 | 13.0 | 13.0 | 11.9 | 11.9 | 11.9 |
| Aerosil [g] | 12 | 12 | 12 | 12 | 12 | 12 | 12 | 12 | 12 |
| Wollastonite [g] | 68 | 68 | 68 | 68 | 68 | 68 | 68 | 68 | 68 |
| Pigments [g] | 2 | 2 | 2 | 2 | 2 | 2 | 2 | 2 | 2 |
| Tensile strength [MPa] | 30 | 31 | 29 | 33 | 33 | 29 | 38 | 38 | 35 |
| Breaking extension [%] | 5 | 8 | 5 | 10 | 8 | 5 | 9 | 5 | 6 |
| Tensile shear strength [MPa] | 20 | 20 | 18 | 21 | 22 | 20 | 24 | 22 | 23 |
| WT1 [MPa] | 18 | 18 | 18 | 19 | 18 | 12 | n.m.* | n.m.* | n.m.* |
| WT2 [MPa] | 16 | 17 | 17 | 18 | n.m.* | n.m.* | n.m.* | n.m.* | n.m.* |
| FE$^1$ at 50° C. [J] | 13.2 | 13.4 | 15.6 | 14.2 | 15.6 | 13.5 | n.m.* | n.m.* | n.m.* |
| FE$^1$ at 23° C. [J] | 13.1 | 13.2 | 14.2 | 14.5 | 16.1 | 12.3 | n.m.* | n.m.* | 14.4 |
| FE$^1$ at −20° C. [J] | 8.7 | 9.0 | 11.7 | 12.0 | 11.8 | 8.0 | 5.7 | 6.2 | 8.8 |
| FE$^1$ at −40° C. [J] | 5.8 | 5.9 | 9.2 | 9.5 | 8.6 | 7.1 | n.m.* | n.m.* | n.m.* |

$^1$FE = fracture energy
*n.m. = not measured.

The value after cooling was measured, and also an accelerated test with the following cycle sequence:

Cycling Test "WT1" (1 Working Week)
   24 hours' storage in salt water solution (5% NaCl at 70° C.)
   48 hours' storage in water (70° C.)
   24 hours under standard conditions (23° C./50% relative humidity)

Cycling Test "WT2" (2 Working Weeks)
   24 hours' storage in salt water solution (5% NaCl at 70° C.)
   48 hours' storage in water (70° C.)
   96 hours under standard conditions (23° C./50% relative humidity)
   24 hours' storage in salt water solution (5% NaCl at 70° C.)
   48 hours' storage in water (70° C.)

The invention claimed is:

1. A process for preparing a mixture of polyisocyanate compounds comprising the steps of
   I) reacting x mol of a carboxyl-terminated butadiene/acrylonitrile copolymer with y mol of a cycloaliphatic 1,2-diamine or of an aromatic o-diamine having two primary amino groups in the proportion $y/x \geq 2$ under conditions which lead to the formation of amide groups;
   II) adding xy mol of a diol; and
   III) reacting the product with z mol of isophorone diisocyanate in the ratio $z/(x+xy) \geq 2$ with formation of urea groups.

2. The process of claim 1, wherein the reaction step I) is followed and reaction step III) is preceded by a step I') of
   I') reacting xx mol of maleic acid dialkyl ester or maleic acid diallyl ester in the proportion $xx/x \geq 0.6$ under conditions which allow Michael addition of the primary amino groups to the double bond of the maleic ester.

3. The process of claim 1, wherein the polyether diol is poly(oxy-1,4-butanediyl)-α-hydro-ω-hydroxyl.

4. The process of claim 1, wherein the ratio is $1.5 \geq xy/x \geq 0.75$.

5. The process of claim 1, wherein the cycloaliphatic 1,2-diamine is 1,2-diaminocyclohexane.

6. A glycidyl-containing compound of the formula (XIV)

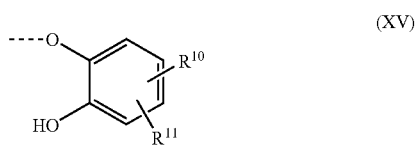

(XV)

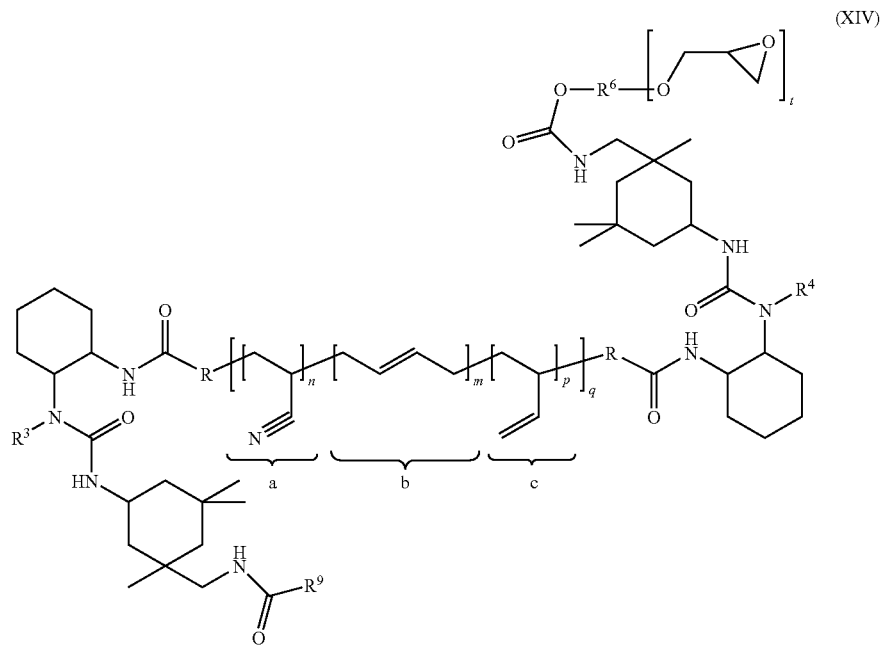

(XIV)

where b and c are the structural elements originating from butadiene, and a is the structural element originating from acrylonitrile;

R is a linear or branched alkylene radical having 1 to 6 C atoms, which is optionally substituted by unsaturated groups;

q is a value between 40 and 70;

$n=0.05$-$0.3$, $m=0.5$-$0.8$, $p=0.1$-$0.2$; where $n+m+p=1$;

$R^3$ and $R^4$ independently of one another are H or are a radical of the formula (II), with $R^7$ being an alkyl radical or allyl radical

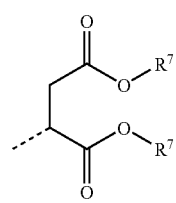

(II)

where $R^8$ is a t+1-valent organic radical, t is a value of 1, 2, 3 or 4, $R^9$ is the formula (XV) or formula (XVI) or is a radical of a primary monoamine following removal of one H of the amino group, or is the formula (XVII)

-continued

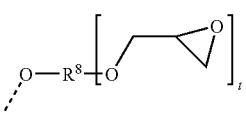

(XVI)

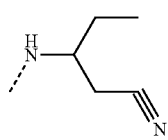

(XVII)

where $R^{10}$ is H or an alkyl, and $R^{11}$ is H or an alkyl radical.

7. The glycidyl-containing compound of claim 6, wherein t=2 and the radical $R^8$ has the formula (XVIII)

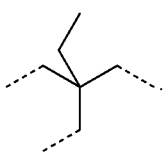

(XVIII)

8. The glycidyl-containing compound of claim 6, wherein the radical R has the formula (X)

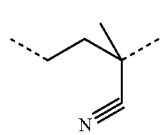

(X)

where the dashed lines represent the attachment sites.

9. An epoxy resin adhesive comprising the glycidyl-containing compound of claim 6.

10. The epoxy resin adhesive of claim 9, wherein the epoxy resin adhesive is a thermosetting epoxy resin adhesive or an ingredient of a thermosetting epoxy resin adhesive.

11. A compound of the formula (I)

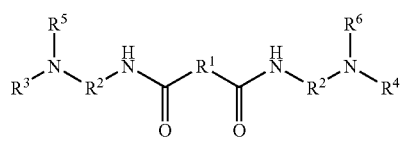

(I)

where $R^1$ is a divalent radical of a carboxyl-terminated butadiene/acrylonitrile copolymer following removal of the terminal carboxyl groups; and $R^2$ is a divalent radical of a cycloaliphatic 1,2 diamine or of an aromatic o-diamine following removal of the two primary amino groups;

$R^3$ and $R^4$ independently of one another are H or are a radical of the formula (II), with $R^7$ being an alkyl radical or allyl radical,

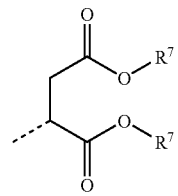

(II)

$R^5$ and $R^6$ are both a radical of the formula (III)

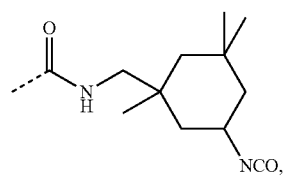

(III)

wherein the composition comprises at least one glycidyl-containing compound of claim 6 and also at least one liquid epoxy resin.

12. The composition of claim 11, wherein the composition comprises at least one NCO-containing polyurethane prepolymer prepared from the reaction of at least one polyol and at least one polyisocyanate.

\* \* \* \* \*